Patented Sept. 25, 1945

2,385,560

UNITED STATES PATENT OFFICE 2,385,560

METHOD OF TESTING A PIGMENT

John K. Wise, Chicago, Ill., assignor to United States Gypsum Company, Chicago, Ill., a corporation of Illinois No Drawing. Application June 16, 1941, Serial No. 398,243

4 Claims. (Cl. 23—230)

The present invention relates to an improved type of coating composition, suitable for use as a paint and the like, comprising a water-soluble aminoplastic condensation product capable of becoming insoluble in an acid-reacting medium, pigments nonreactive therewith, and a setting accelerator which comprises a compound which is capable of hydrolyzing in the presence of water to yield an acid-reacting solution, whereby the aminoplastic condensation product will, upon evaporation of the water contained in the coating composition, becomes insoluble in water so that the resulting coating composition may, after a suitable period, be washed with water without becoming dissolved or dislodged from the surface to which it has been applied.

One of the primary objects of the invention therefore is to provide a coating composition which may be either in dry form or in the form of a solution or paste and in which the binder is primarily an aminoplastic condensation product of the type which, while soluble in water in neutral or slightly alkaline solutions, tends to become insoluble if the hydrogen-ion concentration of the solution is increased to a pH below 5. This may be accomplished, for example, by the addition of either an acid or an acid-reacting substance or of a salt which upon hydrolysis will yield free hydrogen ions. If this composition is to be kept in liquid or paste form for any length of time, it becomes advisable to prevent the premature insolubilization of the aminoplastic by the expedient of incorporating with the composition a small amount of a suitable volatile alkali such as, for example, ammonium hydroxide, morpholine, or the like. If such a composition is applied to a given surface, the water as well as the volatile alkali will evaporate, whereafter the hydrolysis of the accelerator will take place, yielding free hydrogen ions which serve to insolubilize the aminoplastic condensation product.

In its broadest aspects, the invention is particularly applicable to the manufacture of what is known as water-thinnable paints, such as those which are designed for application to masonry, plaster, wood, fiber, or other porous surfaces, upon which the composition will dry to form a water resistant film. Obviously, in order to impart the desired hiding power and coloring power to the material, suitable pigments and fillers are also admixed therewith.

It is also within the scope of the invention to add other film-forming substances, such as, for example, water-soluble gums, water-soluble forms of cellulose ethers—for example, methyl cellulose, and the like.

It has been proposed in the past to manufacture water thinnable paints such as the well-known casein paints of commerce, which are available in dry powdered form as well as in paste and liquid form, and the so-called resin-emulsion paints which generally consist of a protein solution in which a suitable type of alkyd resin has been emulsified.

It is already well known that urea-formaldehyde condensation products can be prepared in water-soluble form and dried to form more or less coherent films merely upon the evaporation of the water used to dissolve the condensation product. Such films, however, will again become dissolved or dispersed by water when it comes in contact therewith, so that obviously no permanent paint could be produced thereby. It is known that insolubilization of these aminoplastic condensation products can be effected by rendering the solution slightly acid.

This insolubilization can be effected by means either of an acid or of a substance, for instance an ammonium salt, which sufficiently hydrolyzes to produce the required amount of free hydrogen ions in the solution. It has been found, however, that there are certain limitations to the production of such a coating material, namely, the necessity of carefully selecting the pigments which are associated therewith. In the first place, these pigments must be entirely nonreactive with the aminoplastic condensation product; but they must also be of such a nature that they will not interfere with the development of acidity in the solution as a result of the presence of, or addition of, an accelerator capable of yielding hydrogen ions. Obviously, if the pigment reacts alkaline of itself or at least is capable of binding the hydrogen ions which are depended upon to insolubilize the aminoplastic condensation product, no such insolubilization can be effected. It therefore becomes necessary to select such pigments as will not interfere with the insolubilization of the material.

In general it may be stated that suitable compositions may comprise a water-soluble aminoplastic resin, some form of pigment such as, for example, various types of lithopone, titanium oxide, antimony oxide and the like, and a small quantity of an ammonium salt of a strong acid. Suitable for this purpose are ammonium chloride, ammonium sulfate, and ammonium nitrate.

In order to determine what pigments will be suitable for this purpose, the following test may be used: 20 grams of the pigment or filler which is to be used in the paint is suspended in 50 c. c. of distilled water containing either 5 c. c. of 4% formalin or 14 grams of a water-soluble urea-formaldehyde resin, and the hydrogen-ion concentration of the thus formed suspension (that is, its pH) is measured by a suitable method—for example, by means of a glass electrode and therewith associated electronic devices. The suspension should preferably be close to neutrality, having a pH of, say, from 6 to 7. An ammonium chloride solution of known concentration is then gradually added to the suspension, using for this purpose a sufficient amount of ammonium chloride to be equivalent to about 5% of ammonium chloride on the basis of the suspended pigment or filler. The hydrogen-ion concentration of the solution should thereupon increase to the extent that the pH thereof drops, say, down to somewhere between 4 and 5. If the pigment will prevent the development of the acidity—that is, the decrease in the pH—such pigment will be unsuitable for the purposes of the present invention.

It has also been discovered that the degree of development of acidity, by for example an ammonium salt, can be somewhat increased by the presence in the finished product—that is, the paint—of a very small amount of free formaldehyde, this being particularly true in the presence of pigments.

If the composition of the present invention is to be made up into paste form so that it may be sold in cans, ready for dilution by the user, two expedients may be employed to keep the material from becoming insoluble in the can. The first expedient is to keep the accelerator out of the composition and to furnish it in a separate container so that it may be added to the paste by the user just prior to application to the surface that is to be painted. The second expedient, and the one which is preferred, is to add to the paste a small amount of a volatile alkali such as ammonium hydroxide, or morpholine, whereafter the accelerator material is added. Usually this is an ammonium salt, preferably ammonium chloride. It is, of course, obvious that a small amount of sodium hydroxide could be employed together with the ammonium salt so as to liberate a small quantity of ammonia. In any event, the purpose is to keep the composition substantially neutral while in the can, before use. What happens when such a composition is applied to the surface to be coated is substantially as follows: The water evaporates, carrying with it the still more volatile ammonia which is evolved from the ammonium hydroxide, so that at about the time the composition is nearly dry practically all the ammonia has escaped. Thereafter, the residual ammonium salt will hydrolyze, yielding free hydrogen ions which then will effect the desired insolubilization of the aminoplastic condensation product. If desired, a small amount of free formaldehyde may also be present in the solution or paste, as already indicated hereinabove.

The pigments, coloring matter, fillers, and the like may be added to an aqueous dispersion or solution of the aminoplastic condensation product, or all of the ingredients may be introduced either conjointly or individually into the water, whereafter the mixture may be agitated, as in a mixing kettle or the like, to obtain a uniform mixture therewith. A very advantageous procedure is to follow the mixing by running the paint through an ordinary paint mill in order to remove lumps and undispersed particles. Other materials may be added as further binders, particularly to improve the resistance of the coating to crazing or check cracking.

Among the aminoplastic condensation products are to be included the well-known types of urea-aldehyde condensation products, such for example as urea-formaldehyde condensation products, thiourea aldehyde and formaldehyde condensation products, substituted thiourea aldehyde condensation products, and the like, provided they are capable of insolubilization in the cold in an acid environment. By the term "urea-aldehyde condensation product" it is intended to cover all of these urea-aldehyde condensation products considered as a genus. This term has been applied to these materials for some years past, and it is generally understood among chemists as meaning the condensation products of urea or carbamide and analogous compounds. For most purposes the simple urea-aldehyde condensation product is suitable. This is now a commercially available product that may be freely purchased on the open market.

As actual examples of compositions which may be made within the scope of the present invention may be mentioned the following:

*Example 1*

| | Parts by weight |
|---|---|
| Urea formaldehyde resin (water soluble) | 392 |
| Concentrated ammonium hydroxide | 25 |
| Pigment, e. g., antimony oxide | 400 |
| Mica | 40 |
| Clay | 360 |
| Ammonium chloride | 16 |
| Water | 385 |

*Example 2*

| | Parts by weight |
|---|---|
| Urea formaldehyde resin (water soluble) | 14 |
| Pigment, such as lithopone or other zinc sulfide pigment | 46 |
| Water | 25 |
| Ammonium chloride | 3 |

Both of these formulas are for stiff pastes. However, the second formula may be made up in dry form merely by omitting the water and may be employed by the user by stirring the mixture into water until it is dissolved. If it is desired to preserve the second composition for any length of time, it is desirable to add sufficient ammonium hydroxide thereto to render it faintly alkaline.

In the above formulas, equivalent amounts of thiourea-aldehyde condensation products may be substituted, and it is also possible to use dicyandiamid condensation products in lieu thereof. However, as the ordinary urea-formaldehyde condensation products are the least expensive of this group, they are generally preferred.

While all pigments are not necessarily adapted for use in connection with the coating composition of the present invention, their adaptability can readily be determined in accordance with the tests hereinabove outlined.

The methods of mixing and the proportions of fillers and pigments are, of course, capable of wide variation, depending upon the color and hiding power of the paint and also whether it is to be used as a final coating or an initial or priming composition.

Saving for himself such modifications as fall within the scope of the art to which this invention appertains, applicant claims:

1. Process of determining the suitability of a pigment for use in a coating composition containing a water-soluble urea-formaldehyde condensation product capable of becoming water-insoluble in an acid-reacting medium which process comprises suspending a quantity of said pigment in an aqueous solution of a substance capable of furnishing free formaldehyde thereto, adding about 5% by weight (as calculated on the dry weight of said pigment) of a salt of ammonium capable of liberating free strong mineral acid, said salt being selected from the group consisting of ammonium chloride, ammonium sulphate and ammonium nitrate, and measuring the hydrogen-ion concentration of the suspension; whereby if the hydrogen-ion concentration of the suspension falls within the range of about pH 4 and pH 5, the suitability of the pigment for the intended use is established.

2. Process of testing a pigment for its potential property of interfering with the hardening of aqueous solutions of urea-formaldehyde condensation products by the development of acidity therein which comprises suspending the pigment that it to be tested in an aqueous solution containing formaldehyde, adding an acid-yielding ammonium salt thereto selected from the group consisting of the chloride, sulphate and nitrate, and after a short interval of time measuring the hydrogen-ion concentration of the suspension to determine whether it will be within the range of about pH 4 to pH 5; failure to attain such a degree of acidity being indicative of the unsuitability of the pigment because of its interference with the development of sufficient acidity to effect the desired hardening of the said condensation product.

3. The process of claim 2 in which the ammonium salt is the chloride.

4. Process of testing a pigment as to its suitability for use in a urea-formaldehyde coating composition which comprises suspending the pigment in the relative proportions of about 20 parts by weight thereof in about 50 parts by weight of water containing about 5 parts of a 4% formalin solution, adding about 1 part by weight of ammonium chloride, and measuring the hydrogen-ion concentration of the resulting mixture, which, if it falls within the range of about pH 4 to about pH 5, indicates the suitability of the pigment.

JOHN K. WISE.